United States Patent [19]

Siewert

[11] 3,958,540
[45] May 25, 1976

[54] STAGED INTERNAL COMBUSTION ENGINE WITH INTERSTAGE TEMPERATURE CONTROL

[75] Inventor: Robert M. Siewert, Birmingham, Mich.

[73] Assignee: General Motors Corporation, Detroit, Mich.

[22] Filed: July 5, 1974

[21] Appl. No.: 485,941

[52] U.S. Cl............................ 123/59 EC; 123/25 A; 123/25 F; 123/25 Q
[51] Int. Cl.²........................................ F02B 75/20
[58] Field of Search............ 123/1 R, 3, 25 A, 25 F, 123/25 Q, 25 C, 37, 52 R, 59 EC; 60/39.17

[56] References Cited
UNITED STATES PATENTS

| | | | |
|---|---|---|---|
| 963,318 | 7/1910 | Pace | 123/25 F |
| 1,665,885 | 4/1928 | Mesurier | 123/25 Q |
| 2,101,554 | 12/1937 | Meyer | 123/25 Q |
| 2,113,601 | 4/1938 | Pratt | 123/1 R |
| 2,113,602 | 4/1938 | Pratt | 123/1 R |
| 3,789,807 | 2/1974 | Pinkerton | 123/59 EC |
| 3,805,752 | 4/1974 | Cataldo | 123/59 EC |

*Primary Examiner*—Wendell E. Burns
*Assistant Examiner*—David D. Reynolds
*Attorney, Agent, or Firm*—Robert J. Outland

[57] ABSTRACT

A staged internal combustion engine is provided with means for controlling temperature of the interstage gases within predetermined ranges appropriate for the varying operating conditions of the engine. The temperature control is responsive to significant engine conditions such as interstage gas temperature, engine speed and inlet manifold pressure to supply temperature controlling fluids to the interstage gases. The temperature controlling fluids include vaporizable liquids, such as water, which are added to limit maximum temperatures of the interstage gases and combustion supporting gases, such as air, which react with excess fuel in the interstage gases to quickly reach and maintain minimum temperatures.

7 Claims, 1 Drawing Figure

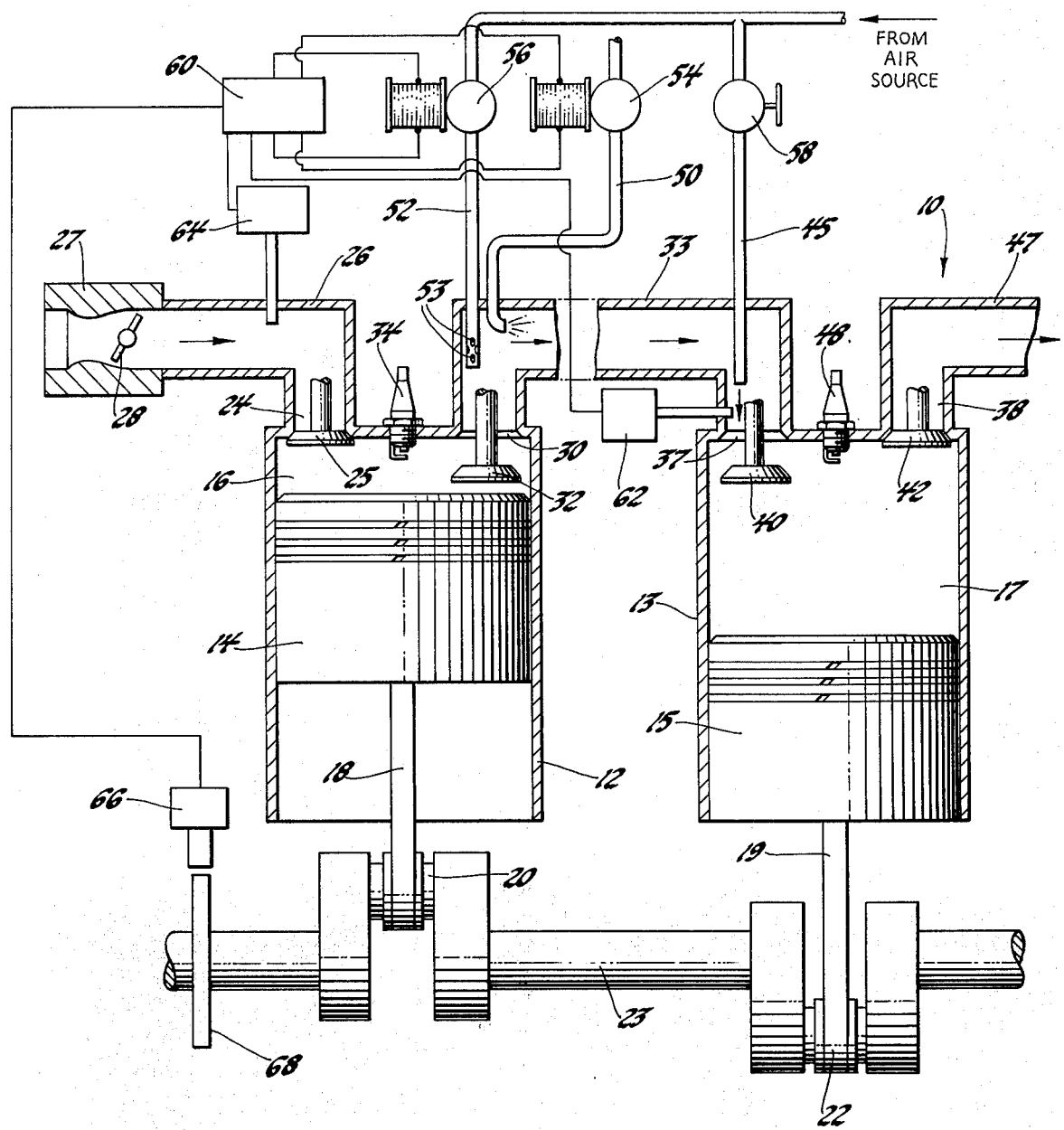

STAGED INTERNAL COMBUSTION ENGINE WITH INTERSTAGE TEMPERATURE CONTROL

FIELD OF THE INVENTION

This invention relates to internal combustion engines of the staged combustion type and, more particularly, to means for controlling interstage gas temperatures in such engines.

BACKGROUND OF THE INVENTION

It is known in the art to arrange an internal combustion engine to perform the combustion of a fresh charge of fuel in two separate sequential working cycles having separate stages of combustion and each yielding an output of work to the engine output shaft.

The general method of operation of such engines, which I refer to as staged combustion engines, involves the admission of a rich air-fuel charge to an engine combustion chamber wherein it is passed through a first stage working cycle including compression, combustion and expansion steps. This cycle results in the delivery of power to the engine output shaft and leaves a residual charge of combustion products and incompletely burned combustibles. To this charge, air is added to form a second and preferably somewhat lean combustible mixture heavily diluted with burned gases. This mixture is passed through a second stage cycle of compression, combustion and expansion, again yielding work to the engine output shaft.

Such a process is capable of being performed sequentially in the same engine combustion chamber. However, it is presently believed preferable to utilize separate combustion chambers of the same engine for performance of the two combustion cycles and to transfer the products resulting from the first stage combustion cycle to the second stage combustion chamber through a connecting interstage passage, conduit or manifold in which the necessary secondary combustion air is added.

Various forms of staged combustion engines have been proposed. Among these are the arrangements disclosed in U.S. Pat. Nos. 2,113,601 and 2,113,602, both granted April 12, 1938 to N. P. Pratt. Additional forms and methods of operation of such engines are disclosed in my copending U.S. patent application Ser. No. 282,390, filed Aug. 21, 1972.

In experimental work with staged combustion engines operating with gasoline fule-air mixtures, I have preferred to utilize conventional spark ignition for initiating first stage combustion. However, I have found that satisfactory engine operation may be obtained under properly controlled conditions utilizing either compression ignition or conventional spark ignition for initiation of second stage combustion.

Both methods of operation have been shown to require some degree of temperature control of the interstage gases in order to maintain engine operation and efficiency under the varying loads and speeds required of automotive type engines. For example, my copending U.S. application Ser. No. 282,390 discloses that interstage gas temperatures must be controlled within predetermined ranges which are functions of other engine variables such as engine speed, load and second stage compression ratio, in order to realize efficient timing of second stage ignition when compression or auto-ignition is utilized. The use of spark ignition in the second stage reduces the criticality but does not eliminate the need for interstage temperature control; since, if the temperature of gas admitted to the second stage is too low, misfiring may occur; while if the temperature is too high, pre-ignition will occur, resulting in overadvanced timing and inefficient operation. In addition, some degree of interstage temperature control is necessary to prevent inefficient thermal reaction in the interstage manifold.

SUMMARY OF THE INVENTION

The present invention provides means for controlling interstage gas temperatures in staged internal combustion engines, in order to maintain such temperatures within desired ranges. More specifically, the invention provides control of interstage gas temperatures by the addition of temperature controlling fluids to the interstage manifold, preferably near its connection with the first stage exhaust port, whereby temperature controlling fluids will be mixed with the interstage gases shortly after their expulsion from the first stage combustion chamber.

One feature of a cooling system according to the invention is that it provides means for cooling the interstage gases by spraying a vaporizable liquid, preferably water, into the interstage manifold, whereby the interstage gases are cooled by vaporization of the liquid.

Another feature of a cooling system according to the invention is that means are provided for heating the interstage gases by directing a combustion supporting fluid, such as air, into the interstage manifold for mixture and reaction with combustibles in the hot gases leaving the first stage so as to increase interstage gas temperatures.

Another feature of the invention is that control means are provided which are operable in response to engine conditions such as interstage gas temperature, engine speed and engine load to control the admission of temperature controlling fluids into the interstage manifold.

These and other features of the invention will be more fully understood from the following description of a preferred embodiment, taken together with the accompanying drawing.

BRIEF DESCRIPTION OF THE DRAWING

The single drawing FIGURE is a diagrammatic view of a staged combustion engine having interstage gas temperature control means in accordance with the invention.

DESCRIPTION OF THE ILLUSTRATED EMBODIMENT

In the drawing, numeral 10 generally indicates an internal combustion engine of the staged combustion type and having a pair of cylinders 12, 13 containing reciprocating pistons 14, 15, respectively, and defining therewith variable volume working and combustion chambers 16, 17, respectively. Pistons 14, 15 are respectively connected by connecting rods 18, 19 to the oppositely eccentric throws 20, 22 of a crankshaft 23.

Cylinder 12 includes an inlet port 24, controlled by an inlet poppet valve 25 and connecting through an inlet manifold or conduit 26 with a source of air and fuel mixture, such as a carburetor 27 having a throttle 28. Cylinder 12 also includes an exhaust or outlet port 30 controlled by an exhaust poppet valve 32 and connecting with an interstage manifold or conduit 33. A spark plug 34 is also provided in the cylinder 12 to ignite combustible fuel mixtures in the combustion chamber 16.

Cylinder 13 includes inlet and exhaust ports 37, 38 controlled respectively by an inlet poppet valve 40 and an exhaust poppet valve 42. Inlet port 37 connects through the interstage manifold 33 with the combustion chamber 16 of cylinder 14. An air admission pipe 45 extends into the interstage manifold 33 at a point adjacent the second stage inlet port 37 to provide secondary combustion air for mixture with the interstage gases supplied to the second stage combustion chamber 17. An exhaust conduit 47 connects with the exhaust port 38 to carry away the second stage exhaust gases. A spark plug 48 is provided in cylinder 13 to ignite combustible fuel mixtures in the combustion chamber 17.

The operation of the engine portions so far disclosed is as follows:

Upon rotation of the crankshaft, pistons 14 and 15 reciprocate in their respective cylinders in timed relation with the valves so as to cause the combustion chambers 16, 17 to cyclically perform four-stroke cycles including the steps of intake, compression, expansion and exhaust. Carburetor 27 supplies air-fuel mixtures, preferably rich in fuel, to the inlet manifold 26 which are admitted in amounts controlled by the throttle 28 to the combustion chambers 16 on the intake stroke of piston 14. Here the charges are compressed, ignited by the spark plug 34, burned and expanded, delivering power to the crankshaft. The remaining gases consisting of combustion products and residual combustibles, for which there was insufficient air to burn in the first stage, are exhausted on the exhaust stroke of piston 14 into the interstage manifold 33. Here secondary air is added through air admission pipe 45 which mixes with the first stage exhaust gases to form a heavily diluted and preferably somewhat lean combustible mixture, that is admitted to the second stage combustion chamber 17 on the intake stroke of piston 15. This charge is then compressed, ignited by the spark plug 48, burned and expanded in chamber 17, with the resultant delivery of power to the crankshaft. Subsequently, valve 42 is opened and the burned gases are exhausted through exhaust conduit 47.

As disclosed in my previously mentioned application Ser. No. 282,390, the engine may also be operated utilizing compression-ignition of charges in the second stage combustion chamber 17. Also if desired, both spark and compression-ignition could be utilized in the second stage cylinder under varying operating circumstances. If compression-ignition is used exclusively, the spark plug 48 could be dispensed with. In addition, the second stage cylinder could be provided with means, such as a movable piston, for varying the compression ratio of the second stage combustion chamber in order to assist in controlling the timing of ignition when compression-ignition is used.

Further in accordance with my previously mentioned application, suitable means, such as a heat exchanger, could be provided in the interstage manifold 33 to control the temperature of the interstage gases in the manner required for proper operation of the engine. In general, such control involves maintaining the temperature of the interstage gases delivered to the second stage cylinder within predetermined temperature ranges suitable for various engine operating conditions so that misfiring due to excessively cold temperatures and pre-ignition due to excessively high temperatures are both avoided. In addition, it is desirable to maintain interstage temperatures below a predetermined level to avoid undesired reaction of combustibles in the interstage gases with the air added in the interstage manifold.

In accordance with the present invention, control of interstage gas temperatures may be accomplished by the novel means and methods described herein. To accomplish this, engine 10 is provided with a water inlet pipe 50 and an air inlet pipe 52, each extending into the interior of the interstage manifold 33 at the end adjacent the first stage exhaust port 30. The outlet end of pipe 52 may be perforated as at 53 to better distribute fluid supplied thereby within the manifold 33. Water pipe 50 is connected with a suitable source of pressure water supply, such as an engine operated water pump and storage tank (not shown), and is provided with a solenoid operated valve 54 to control water flow through the pipe 50 to the interstage manifold. Air pipe 52 is connected with a suitable source of pressurized air, such as an engine operated air pump (not shown), and is provided with a solenoid actuated valve 56 for controlling air flow through pipe 52 to the interstage manifold. As shown in the drawing, a common source of air may be provided for both pipes 45 and 52, and pipe 45 may be provided with a valve 58 operated manually or by suitable automatic control means in order to control the relative amounts of secondary air delivered through the pipes 45 and 52.

While it would be possible under some conditions to manually actuate the water and air temperature control valves 54, 56, it is preferable to provide suitable control means to actuate the valves in response to predetermined engine operating conditions. Engine 10 is provided with such a system which includes control actuating means 60, such as suitable electronic circuitry, for actuating the valves in response to predetermined signals from individual sensors indicating the various pertinent engine conditions. Examples of electronic circuitry suitable for this purpose are known in the prior art and are shown, for instance, by the comparator circuit 21 of U.S. Pat. No. 3,767,972 Noddings et al. and the comparison circuit 14 of U.S. Pat. No. 3,580,355 Kitano et al. Both references disclose means for comparing three separate input signals and responding thereto in predetermined manner by actuating either of two oppositely acting output devices or actuating neither, thus maintaining the status quo. The sensors for use with this circuitry include a temperature sensor 62 mounted to sense the temperature of the interstage gases adjacent the second stage inlet port 37, a pressure sensor 64 mounted to sense the inlet manifold pressure 26 which indicates the load on the engine, and a speed sensor 66 in the form of an induction coil mounted adjacent toothed wheel 68 on the engine crankshaft to act as an indication of the engine speed. The sensors 62, 64, 66 feed information on the various engine operating conditions of significance to the control actuating means 60 which is arranged to operate the valves to supply either water or air as necessary to the interstage manifold in order to control gas temperatures within the predetermined ranges.

For example, when the engine is started after an extended shutdown, the sensor 62 will indicate that the interstage gas temperature is below the desired range, whereby the control actuating means will open the valve 56, permitting air to flow through the pipe 52 into the interstage manifold adjacent the first stage exhaust port 30. This air will mix with the hot exhaust gases coming from the first stage chamber 16, causing combustion of some of the unburned fuel within the interstage manifold and heating the interstage gases. When the proper temperature is reached, as determined in part by other engine conditions such as speed and load, the flow of air through pipe 52 will be shutoff and secondary air will then be supplied solely through the pipe 45 at the cool end of the interstage manifold where little chance of undesired reaction is present.

On the other hand, if the interstage temperature becomes excessive, the control devices will open the valve 54, permitting a small amount of water to be sprayed into the interstage manifold adjacent the first stage exhaust port 30. The water will be heated and vaporized by the heat of the interstage gases, thus cooling the gases to the extent of the latent heat of vaporization and sensible heating of the water added. In this way, interstage temperatures may be controlled within desired limits.

Details of the disclosed embodiment may be varied in many ways. For example, the water and air supply pipes 50, 52 might be connected with a single nozzle instead of having separate outlets to the interstage manifold. Further, if desired, water could be supplied through air admission pipe 45. In multi-cylinder engines, water and/or air supply could be tailored to individual cylinder requirements by admission adjacent the respective second stage cylinder inlet ports. Changes could also be made in the selection of engine operating conditions used to control interstage gas temperatures or in the manner of applying such controls.

If desired, temperature control fluid additive systems could also be utilized in staged internal combustion engines in combination with systems including heat exchangers for additional temperature control, in which case the fluid additive systems could be limited to short term transient operation, thereby limiting the need for storage of temperature control fluids, such as water.

The explanation of the invention by reference to certain specific embodiments is not intended to limit the possible application of the invention, which should be given the full scope permitted by the language of the following claims.

What is claimed is:

1. In combination with a staged internal combustion engine of the type having housing means defining first and second stage expansible combustion chambers each including inlet and exhaust ports and means connected with an output shaft to cyclically expand the contract said chambers and control said ports to consecutively cause admission and combustion of combustible mixtures in said chambers and exhaust of burned mixtures from said chambers with a resultant delivery of power to said output shaft, said engine including means for delivering a rich combustible mixture to said first stage chamber for combustion therein, means communicating the exhaust port of said first stage chamber with the intake port of said second stage chamber for transferring partially burned fuel charges from the first stage to the second stage combustion chamber, said communicating means including an interstage conduit, secondary air supply means connecting with said interstage conduit to supply supplementary air for mixture with said partially burned fuel charges in said conduit to form dilute combustible mixtures for admission to said second stage combustion chamber, and temperature control fluid supply means connected with said interstage conduit adjacent said first stage exhaust port, said fluid supply means being operable in response to predetermined conditions of engine operation to supply fluid to said interstage conduit adjacent said first stage exhaust port for mixture with the interstage gases to control the temperature thereof.

2. The combination of claim 1 wherein said fluid supply means includes means for spraying a non-combustible vaporizable liquid into said interstage conduit adjacent said first stage exhaust port and control means connected with said liquid spraying means and responsive to temperatures above a predetermined temperature of the interstage gases adjacent said second stage inlet port to deliver liquid into said interstage conduit for cooling said interstage gases to said predetermined temperature by vaporization of said liquid.

3. The combination of claim 2 wherein said vaporizable liquid is water and said control means is further responsive to engine speed and inlet manifold pressure to selectively vary the predetermined control temperature in accordance therewith.

4. The combination of claim 1 wherein said fluid supply means include means for supplying a combustion supporting gas to said interstage conduit adjacent said first stage exhaust port and control means connected with said gas supply means and responsive to temperatures below a predetermined temperature of the interstage gases adjacent said second stage inlet port to deliver such combustion supporting gas into said interstage conduit for reaction with the interstage gases leaving said first stage exhaust port to increase the temperature of said interstage gases to said predetermined temperature.

5. The combination of claim 4 wherein said combustion supporting gas is air, said control means being further responsive to engine speed and inlet manifold pressure to selectively vary the predetermined control temperature in accordance therewith.

6 A staged combustion engine having a housing defining first and second stage expansible combustion chambers each having an inlet port and an exhaust port, means connected with an output shaft to cyclically expand and contract said chambers and control said ports whereby to cause consecutive admission and combustion of combustible mixtures therein and subsequent exhaust of burned mixtures from said chambers, with a resultant delivery of power to said output shaft, a throttled inlet conduit connecting with said first stage inlet port and provided with charge forming means for supplying a rich combustible air-fuel mixture to said inlet conduit and thereby to said first stage combustion chamber, an interstage conduit connecting the exhaust port of said first stage chamber with the intake port of said second stage chamber for transferring partially burned fuel charges from the first to the second stage combustion chamber, secondary air supply means connecting with said interstage conduit adjacent said second stage inlet port to supply supplementary air for mixture with said partially burned fuel charges in said interstage conduit so as to form dilute combustible mixtures for admission to said second stage combustion chamber, and interstage gas temperature control means including means for supplying a temperature modifying fluid to said interstage conduit adjacent said first stage exhaust port for mixing with the interstage gases to modify the temperature thereof and control means responsive to at least one variable condition of engine operation to actuate said fluid supply means to supply such fluid during a predetermined range of such variable engine operating condition.

7. A staged combustion engine having a housing defining first and second stage expansible combustion chambers each having an inlet port and an exhaust port, means connected with an output shaft to cyclically expand and contract said chambers and control said ports whereby to cause consecutive admission and combustion of combustible mixtures therein and subsequent exhaust of burned mixtures from said chambers, with a resultant delivery of power to said output shaft.

a throttled inlet conduit connecting with said first stage inlet port and provided with charge forming means for supplying a rich combustible air-fuel mixture to said inlet conduit and thereby to said first stage combustion chamber, an interstage conduit connecting the exhaust port of said first stage chamber with the intake port of said second stage chamber for transferring partially burned fuel charges from the first to the second stage combustion chamber, secondry air supply means connecting with said interstage conduit adjacent said second stage inlet port to supply supplementary air for mixture with said partially burned fuel charges in said interstage conduit, and interstage temperature control means for maintaining predetermined temperature conditions in the interstage gases, said temperature control means including an air supply conduit connected with said interstage conduit adjacent the first stage exhaust port and with a source of pressurized air, a water supply conduit connected with said interstage conduit adjacent said first stage exhaust port and with a source of pressurized water, and control means operable in response to predetermined conditions of (1) interstage gas temperature adjacent said second stage inlet port, (2) engine speed and (3) engine load to control the admission of air and water to said interstage conduit to maintain interstage gas temperatures within predetermined ranges.

* * * * *

UNITED STATES PATENT AND TRADEMARK OFFICE
CERTIFICATE OF CORRECTION

PATENT NO. : 3,958,540
DATED : May 25, 1976
INVENTOR(S) : Robert M. Siewert

It is certified that error appears in the above-identified patent and that said Letters Patent are hereby corrected as shown below:

Column 1, line 49, "fule-air" should read --fuel-air--.

Column 5, line 50, "the" should read --and--.

*Signed and Sealed this*

[SEAL]

Fourteenth *Day of* September 1976

*Attest:*

RUTH C. MASON
*Attesting Officer*

C. MARSHALL DANN
*Commissioner of Patents and Trademarks*